United States Patent [19]

Plummer et al.

[11] Patent Number: 5,097,131
[45] Date of Patent: Mar. 17, 1992

[54] NUCLEAR MEDICINE CAMERA GANTRY SYSTEM WITH VERTICALLY STORED COLLIMATORS

[75] Inventors: Steven J. Plummer, Hudson, Ohio; David L. York, Caryville, Tenn.

[73] Assignee: Picker International, Inc., Highland Hts., Ohio

[21] Appl. No.: 616,864

[22] Filed: Nov. 21, 1990

[51] Int. Cl.⁵ .............................................. G01T 1/163
[52] U.S. Cl. .......................... 250/363.08; 250/363.01; 378/148
[58] Field of Search ...................... 250/363.10, 363.05, 250/363.08; 378/7, 147, 148

[56] References Cited

FOREIGN PATENT DOCUMENTS 0180476  10/1984  Japan ............................... 250/363.1

*Primary Examiner*—Janice A. Howell
*Assistant Examiner*—Richard Hanig
*Attorney, Agent, or Firm*—Fay, Sharpe, Beall, Fagan, Minnich & McKee

[57] ABSTRACT

An outer gantry (20) is movably mounted on wheels to move along tracks (22). An inner gantry (30) rotatably mounted on the outer gantry includes at least a pair of guide rods (56, 58) on which detector heads (32, 34) are slidably mounted. Motors (92, 102) selectively translate the detector heads along the guide rods. A chain and sprocket arrangement (116, 114; 128, 126) constrains the heads against canting and maintains opposite sides of the detector heads in alignment as the detector heads move and as the inner gantry rotates. Each detector head includes a roller bearing track or channel portion (140) on which a horizontal track portion (142) of a collimator (144) is hung vertically. A collimator connecting assembly (150) connects a bottom portion of the collimator to the detector head and secures it against further horizontal movement. A collimator cart (200) includes an analogous roller track portion (202) for supporting the collimators by the collimator guide track portion as collimators are moved between the detector head and like track portion (192) of a detector storage rack (190).

26 Claims, 13 Drawing Sheets

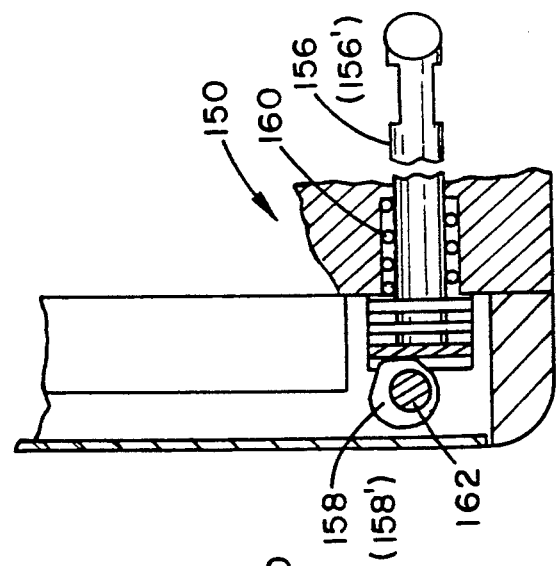
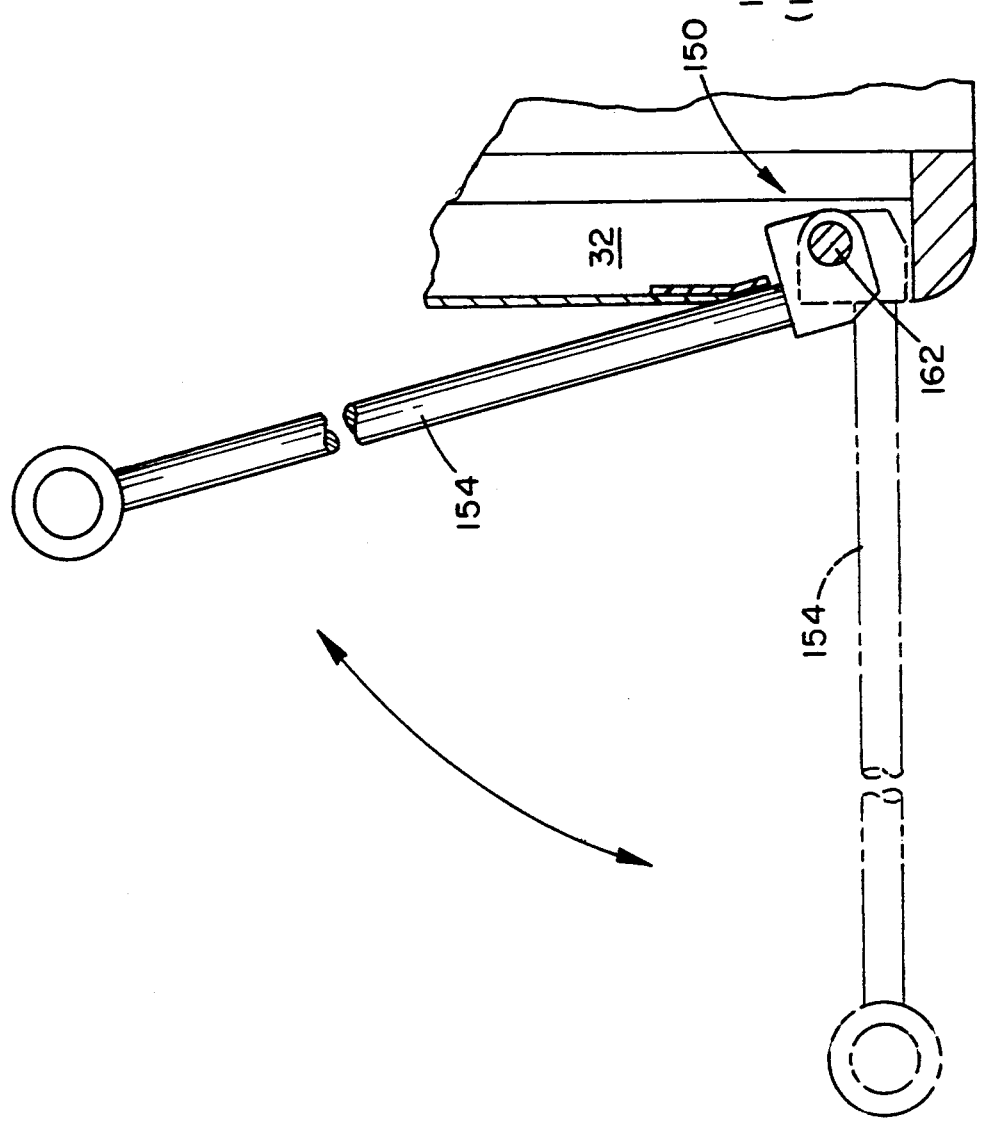

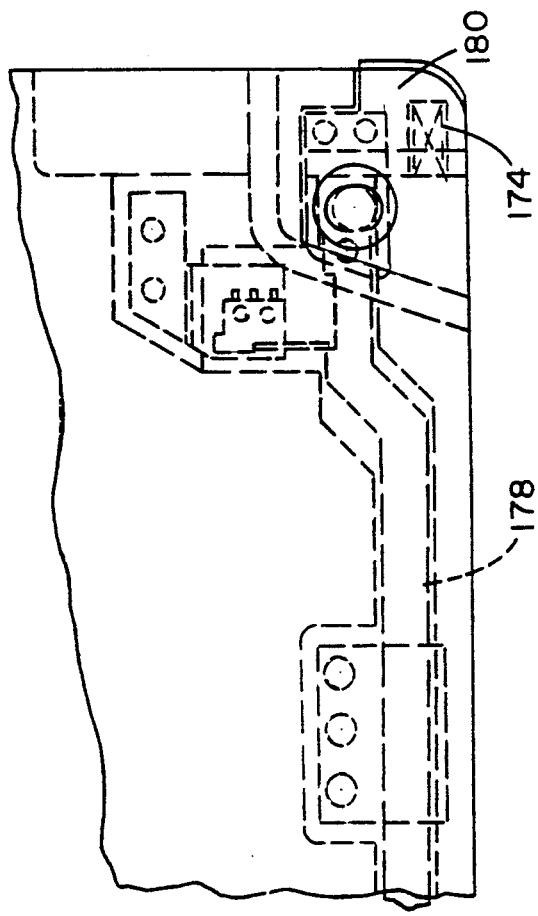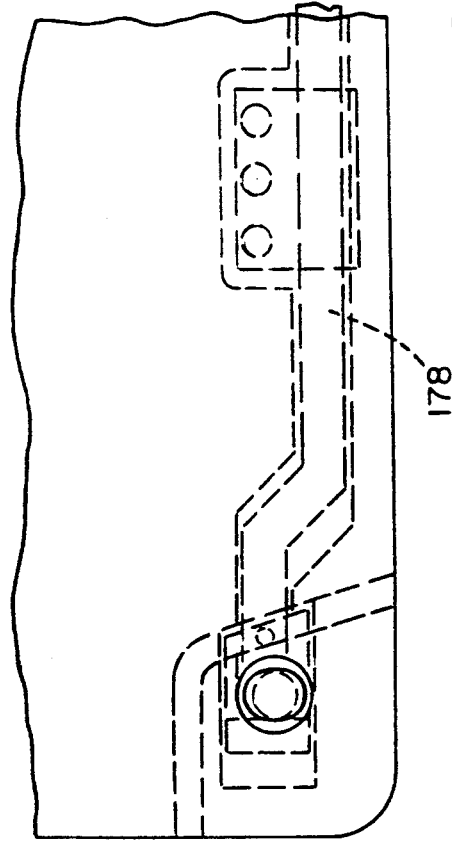
FIG. 8
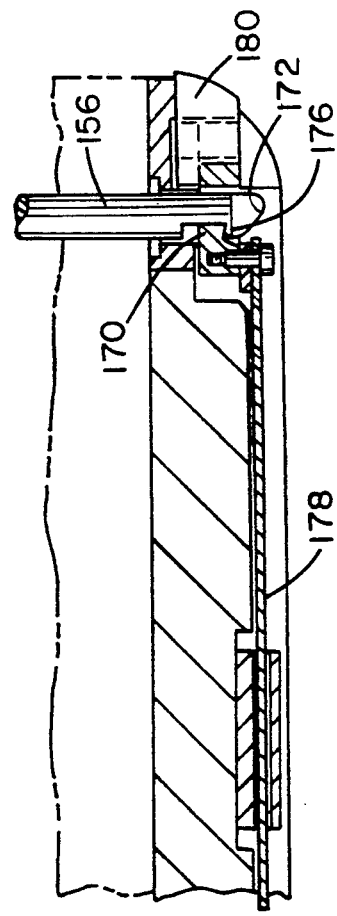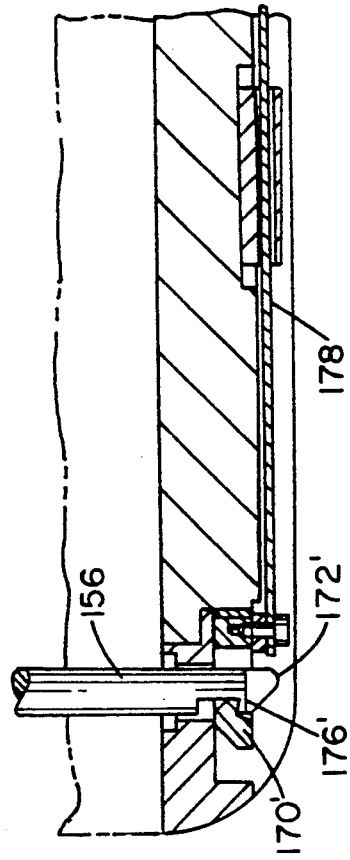
FIG. 7

NUCLEAR MEDICINE CAMERA GANTRY SYSTEM WITH VERTICALLY STORED COLLIMATORS

BACKGROUND OF THE INVENTION

The present invention relates to gantries for medical diagnostic equipment. It finds particular application in conjunction with nuclear or gamma camera systems and will be described with particular reference thereto. However, it is to be appreciated, that the invention will also find application in conjunction with PET and other diagnostic equipment.

Heretofore, nuclear or gamma cameras have included a detector head which receives radiation emanating from the patient. The head includes a flat scintillation crystal which converts incident radiation to flashes of light. Internal electronics convert each flash of light into an indication of the location and energy of the received incident radiation event. Collimators are commonly mounted to the face of the detector head such that the scintillation crystal only receives radiation coming generally straight toward it. Generally, the collimators are a series of lead vanes arranged in a grid. The height of the vanes and their spacing control the angle at which received radiation may differ from perpendicular. Different collimators are provided for different types of medical procedures.

Various mechanical gantry systems have been provided which enable the detector head, typically on the order of several hundred pounds, to be positioned at a selected location over the patient. Commonly, the gantry is also motor controlled such that the detector head can be moved continuously or intermittently either (i) longitudinally along the patient or (ii) circumferentially around the patient. Many gantry systems also support a second detector head which is positioned 180° oppositely around the patient from the first head.

In one of the prior art gantry systems, each head was mounted on a pair of arms. The arms are centrally pivotally with a large diameter bearing ring and had a counterweight at the other end. Although the counterweights reduce the effective weight of the camera head the length of the cantilevered arms required that the gantry consume a relatively large area. Moreover, moving counterweights tended to be a safety hazard to operator personnel.

Another prior art camera mounted the head pivotally to a single arm with appropriate control mechanisms to move and rotate the arm and head. By eliminating the counterweights, space was saved. However, the large weight of the heads necessitated solid parts and strong drive mechanisms.

In another prior art system, the head was mounted for longitudinal movement along an elongated horizontal beam. The beam was connected at opposite ends for rotation around the circumference of the patient.

In another prior art system, the patient was received along an axis of a pair of spaced, parallel large diameter bearings. A camera head and a counterweight were connected oppositely with the bearings. Alternately, a second head was connected with the inner race diametrically opposite the first head.

For axial scans, the camera head and the patient were moved relative to each other. In some of the prior art systems, the entire camera gantry was mounted on floor rails to be moved longitudinally relative to a stationary patient.

Difficulties were encountered in the prior art gantry systems during changing of the collimators. Typically, the collimators were stored flat, such as on the top of a cart. The cart would be wheeled to a preselected location relative to the gantry. The head was positioned horizontally, facing down, typically about three feet off the floor. Either the cart top or the detector head were moved until the head and collimator were aligned for mounting. Typically, the carts had an adjustment mechanism for moving the collimator up and down. The detector head would be positioned at a preselected collimator mounting position, generally horizontally facing downward about three feet from the floor. The cart would then be positioned underneath the head and raised. The position of the cart would be adjusted as the collimator was raised to assure that bolt apertures in the collimator aligned with complementary bolt apertures in the detector head. This was a tedious alignment procedure. Bolts or other connectors were passed through apertures in the collimator and threadedly or otherwise connected to the head.

One problem with this type of collimator system was that an extended amount of floor space was required for collimator storage. Each stored collimator required an area its own size. With a dual head camera system, the collimator storage requirements were doubled.

Another problem with these prior art collimator systems is that bolting and unbolting collimators from the detector heads was time consuming and required special tools. Due to the heavy weight of the collimators, care had to be taken to tighten the bolts sufficiently but without damaging the soft lead collimator or detector head housing.

The lead collimators were typically a few hundred pounds. Collimators of different heights or different vane widths or spacings vary significantly in weight. The change in weight from collimator to collimator and the great weight of the detector head could alter the ability of the gantry to position the detector head properly. The weight tended to cause the head to sag or cart has the gantry rotated the head.

The present invention contemplates a new and improved gantry system which overcomes the above-referenced problems and others.

SUMMARY OF THE INVENTION

In accordance with one aspect of the present invention, the detector head and collimator have an intermeshing track and roller assembly such that the collimators are rollingly received on the detector head.

In accordance with a more limited aspect of the present invention, a plurality of collimators are hung vertically in a storage rack. A transfer cart is selectively positioned adjacent the storage rack. A selected one of the collimators is transferred horizontally to the transfer cart while remaining in the vertical orientation. The cart is selectively aligned with a generally vertically oriented detector head and the collimator is transferred horizontally from the transfer cart to the detector head retaining the vertical orientation.

In accordance with a more limited aspect of the present invention, the camera head has a single roller track which rollably engages a single track of an associated collimator, to simplify alignment. A latch assembly fixes an opposite end of the collimator to the detector head.

In accordance with another aspect of the present invention, the detector head slides along guides disposed along opposite sides. A single drive mechanism is provided for translating the detector head. The drive mechanism is connected with one side of the detector head. A chain or other flexible drive arrangement assures that both sides move uniformly, in parallel, even with collimators of different weights.

More specifically to the preferred embodiment, the chain is connected at opposite ends with opposite sides of the detector head. The chain passes from one side of the head, parallel to the adjacent guide, disposed toward the center of the guides and back passed the head one end over sprockets or other means for guiding the chain around the head and adjacent end of the guides to the detector head other end. A second chain and sprocket arrangement connects the detector head other end with the detector head one end. In this manner, each end of the detector head is prevented by the chains and sprockets from getting ahead of the other.

One advantage of the present invention is that it provides for a simplified, space efficient gantry which facilitates accurate movement of the detector head.

Another advantage of the present invention is that is simplifies changing of collimators.

Another advantage of the present invention is that it minimizes collimator storage space.

Another advantage of the present invention is that it improves gantry and detector head stability.

Still further advantages of the present invention will become apparent to those of ordinary skill in the art upon reading and understanding the followed detailed description of the preferred embodiments.

BRIEF DESCRIPTION OF THE DRAWINGS

The invention may take form in various parts and arrangements of parts and in various steps and arrangements of steps. The drawings are only for purposes of illustrating a preferred embodiment and are not to be construed as limiting the invention.

FIG. 5 is a side view of a detector head portion of a mechanism for anchoring a collimator to the detector head;

FIG. 6 is another side view in partial section of the mechanism of FIG. 5;

FIG. 7 is a sectional view through a collimator illustrating the anchoring mechanism of FIG. 5;

FIG. 8 is a rear view of a lower portion of the collimator illustrating the anchoring mechanism of FIG. 7;

DETAILED DESCRIPTION OF THE PREFERRED EMBODIMENTS

Figure 1:
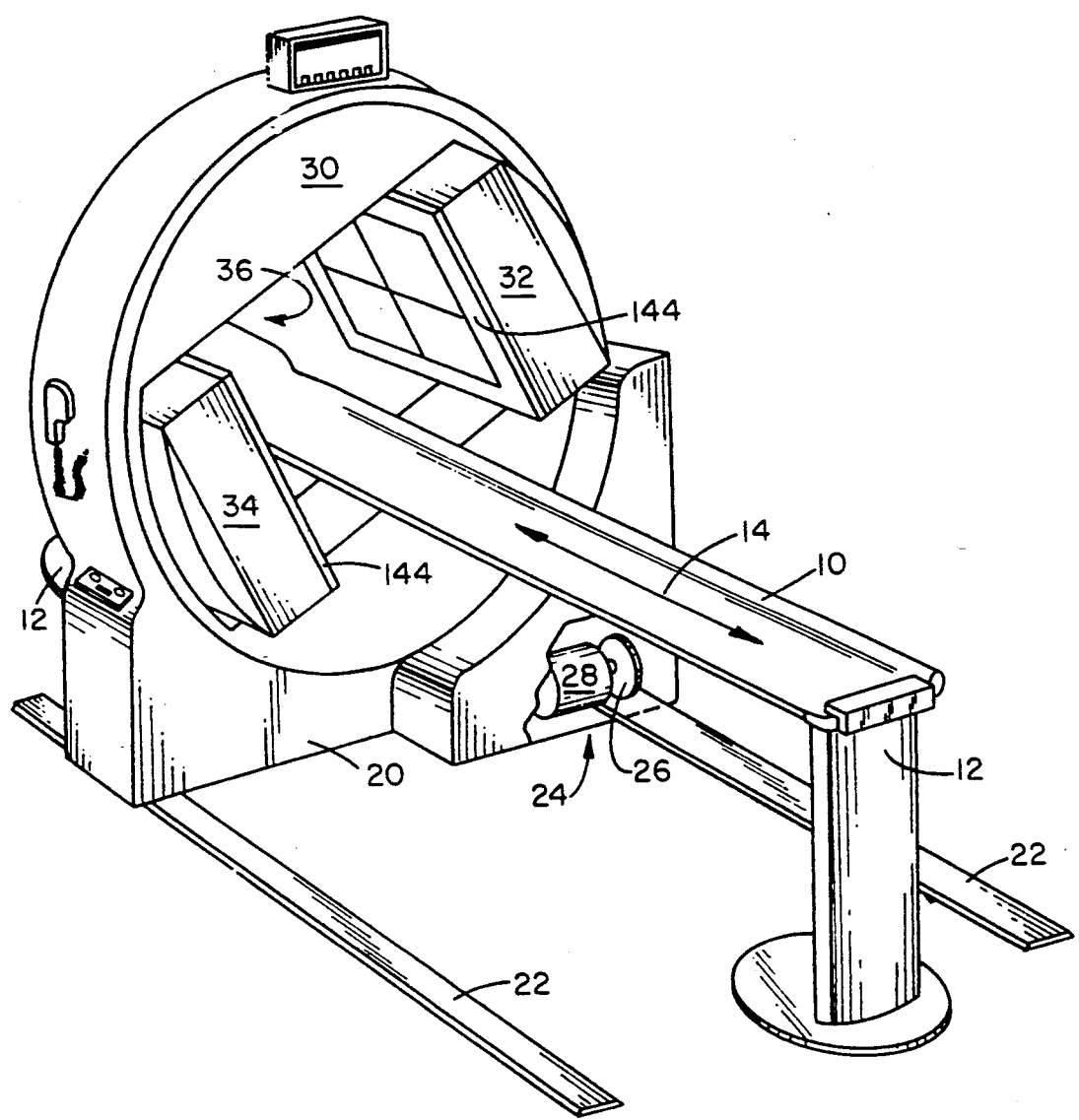
FIG. 1 is a perspective view of a gamma camera gantry in accordance with the present invention.

With reference to FIG. 1, a patient table 10 is mounted to stationary, vertical supports 12 at opposite ends. The patient table is selectively positionable to supported patient along a longitudinal axis 14.

An outer gantry 20 is movably mounted on tracks 22 which extend parallel to the longitudinal axis. An outer gantry moving means 24 selectively moves the outer gantry 20 along the rails 22 in a path parallel to the longitudinal axis. In the illustrated embodiment, the longitudinal moving means includes wheels 26 for supporting the outer gantry on the tracks. A motive power means, such as a motor 28, selectively drives one of the wheels which frictionally engages the track and drives the gantry therealong.

An inner or rotating gantry 30 is rotatably mounted on the outer gantry 20. A first camera or detector head 32 is movably mounted to the inner gantry. A second detector head 34 is movably mounted to the inner gantry opposite to the first camera head. The inner gantry defines a central, patient receiving aperture 36 for receiving the patient table and, particularly, a supported patient along the longitudinal axis. The aperture 36 is enlarged to receive the detector heads in any of a variety of displacements from the longitudinal axis and any of a variety of angular orientations to the axis.

Each detector head includes a scintillation crystal that emits a flash of light in response to incident radiation. An array of photomultiplier tubes convert each light flash into a corresponding electrical signal. A resolver circuit resolves the (x,y) coordinates of each light flash and the energy of the incident radiation. After appropriate uniformity and linearity correction, the count or number of flashes at each (x,y) coordinate is converted to gray scale and displayed on a CRT or video monitor.

Figure 2:
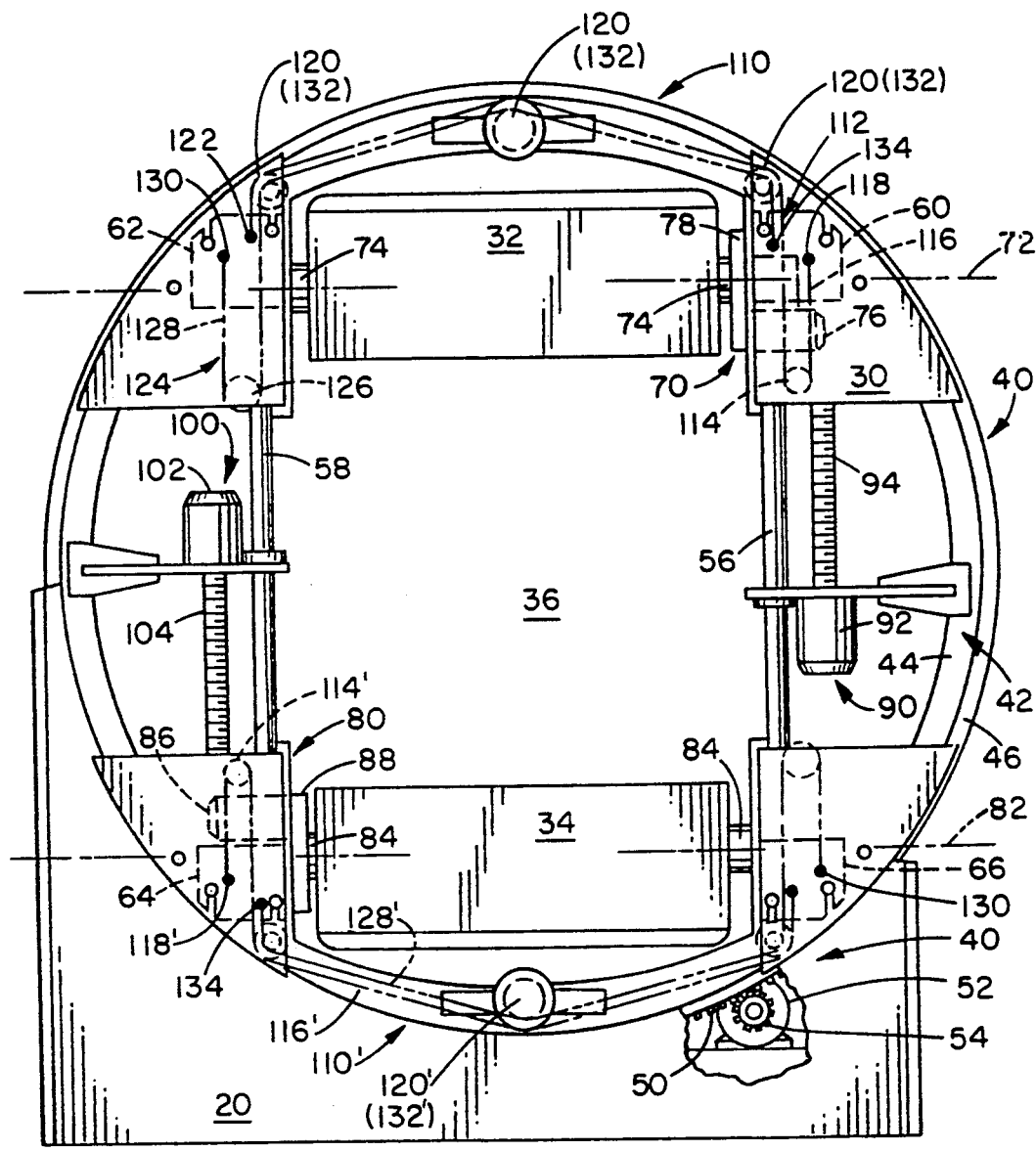
FIG. 2 is a front view of the gantry of FIG. 1 with a cover of the inner gantry removed.

With reference to FIG. 2, an inner gantry rotating means 40 rotates the inner gantry 30 relative to the stationary outer gantry 20. The inner gantry rotating means 40 includes a large diameter bearing 42 having an inner race 44, an outer race 46, and ball or roller bearings therebetween. The inner bearing race 44 extends peripherally around the inner gantry 30 and is a main structural member thereof.

A large diameter gear 50 is connected with the inner race 44. A motive power means, such as an electric motor 52 mounted to the outer gantry, provides rotational energy to a gear 54 that meshes With the large diameter gear 50. By applying motive force with motor 52, the inner gantry and associated detector heads are caused to rotate around the longitudinal axis.

A pair of guides or rods 56, 58 extend in parallel to either side of patient receiving aperture 36. The rods are rigidly mounted at opposite ends to the inner bearing race 44.

The first detector head 32 is connected at opposite sides with carriages 60, 62. The carriages are slidably mounted on guide rods 56, 58, respectively. The second detector head 34 is similarly mounted on carriages 64, 66 which slidably receive guide rods 56, 58, respectively.

A first detector head angular position adjusting means 70 selectively rotates the first detector head 32 about a first axis 72. The first head is mounted to mounting shaft portions 74 which are received in bearings in carriages 60, 62 to permit the shaft and head to rotate around the first axis 62. A motive power means, such as a motor 76, mounted to one of the carriages, provides motive power through a gear or chain assembly 78 to rotate the mounting shaft portions 74 hence the first detector head 32.

A second detector head angular position adjusting means so rotates the second detector head 34 about a second axis 82. The second head is mounted to mounting shaft portions 84 which are received in bearings in carriages 64, 66 to permit the shaft portions and detector head to rotate around the second axis 82. A motive power means, such as a motor 86 mounted on one of the carriages, provides motive power through a gear or chain assembly 88 to rotate the shaft portions 84, hence the detector head. The first and second axes are disposed in a plane which is transverse to the longitudinal axis.

A first head translating means 90 selectively moves or translates the first: detector head 32 toward and away from the longitudinal axis. A motor 92 rotates an acme drive screw 94 that is threadedly received through a driven one of the slide carriages 60. Carriage 62 is not driven or free sliding. By selectively providing energy to the motor 92, the carriages are caused to slide along guide rods 56, 58.

A second head traversing means 100 selectively translates or moves the second detector head 34 toward and away from the longitudinal axis. A motor 102 rotates an acme drive screw 104 that is threadedly received in one of the slide carriages 64. By selectively providing energy to the motor 102, the carriages slide along the rods 56, 58 translating the second detector head.

With this arrangement, the inner gantry rotating means 40 rotates the detector heads continuously or incrementally around the patient. The heads can be positioned stationarily at any angular increment around the longitudinal axis. The first and second detector head angular position means 70 adjusts the angular position of the first head 32 about the first axis 62. The second head angular adjustment means so rotates the second head to a selected angular orientation about the second axis 72, independently of the position of the first head. The first head translating means 90 and the second head translating means 100 selectively move the first and second heads, independently, closer to and further from the patient table 10.

As the inner gantry rotates, the heavy detector heads exert different forces along the guide rods. When the rods are horizontal, the heads are stably supported. However, when the guide rods are at an angle, gravity exerts a component of force along the rods. One carriage of each head is fixed by the drive screw of the translating means. The other carriage tends to slide downward along the guide rod. The amount by which the free carriage leads or lags the driven carriage varies with the magnitude of the force component along the guide rod, i.e. The angular position of the inner gantry and the mass of the head.

The first head 32 has a first canting eliminating means 110 for preventing the free carriage 62, 66 from leading or lagging the driven carriage. The second head 34 has a like second canting eliminating means 110', the components of which are described by the same reference numerals as the first canting eliminating means but followed by a prime ('). The canting eliminating means 110, 110' includes a leading preventing means 112, 112' and a lagging preventing means 124, 124' to eliminate canting by preventing the free carriage from leading or lagging the driven carriage. More specifically, a leading preventing means 112 includes a sprocket or pulley means 114 mounted adjacent a central portion of the guide rod 56. A first chain 116 connected at one end 118 to the driven carriage, extends parallel to the guide rod to the sprocket 114. The chain 116 extends from sprocket 114 over a guide means 120 which guides the chain around along the inner bearing end of guide bars. The chain extends from the chain guide means 120 parallel to the other guide rod 58 and has a second end 122 fixed to the free carriage 62.

A lagging preventing means 124 includes a stationary sprocket or pulley means 126 mounted adjacent a central portion of the free carriage guide rod. A second chain 128 has one end 130 connected to the free carriage, passes parallel to the guide rod over sprocket 126, and parallel to the guide rod 58 to a second guide assembly 132 for guiding the second chain around the inner bearing mounted end of the guide rods. The second chain extends from the second guide assembly parallel to the other guide rod to a free end 134 that is fixed to the driven carriage.

Figure 3:
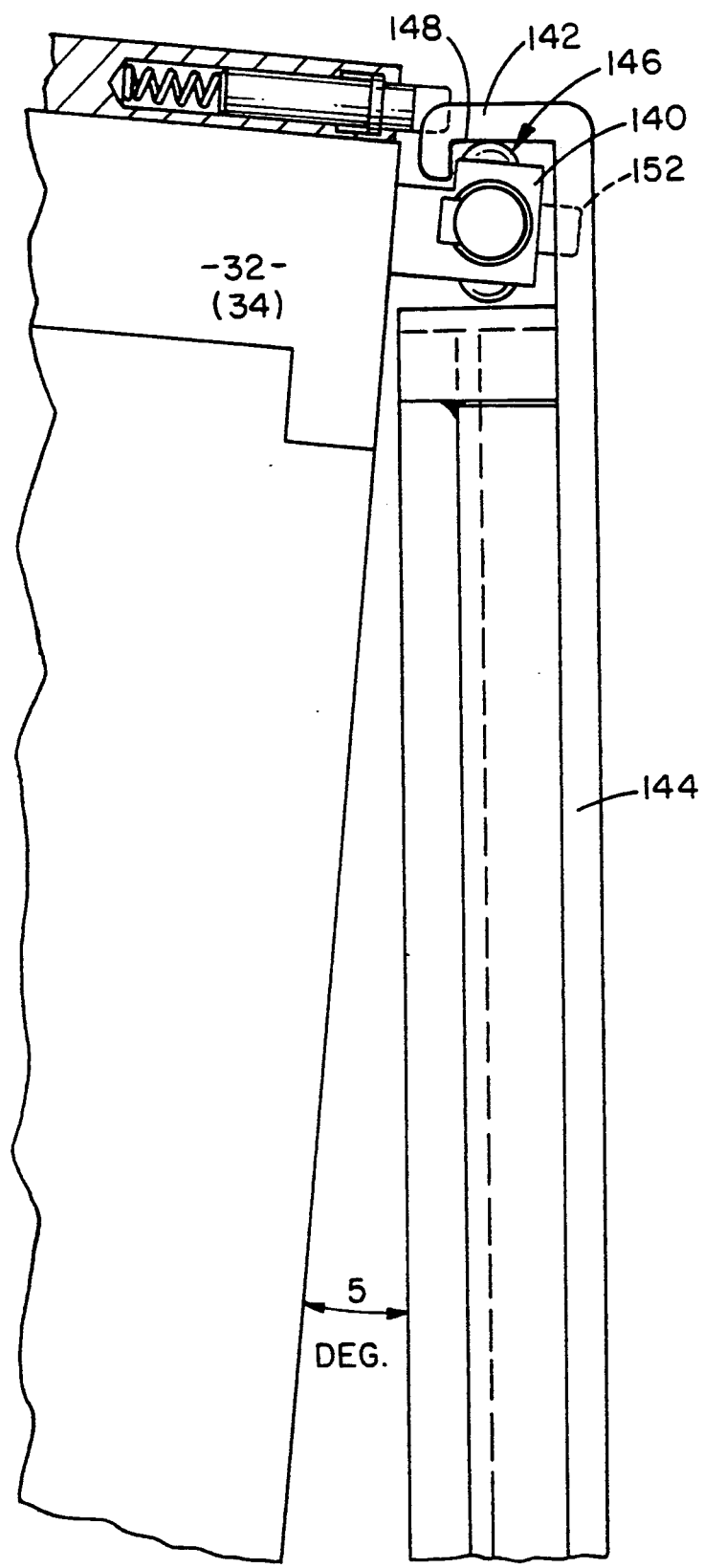
FIG. 3 is a side view of a collimator hung on one of the detector heads of FIG. 1 during collimator mounting or unmounting procedures.
Figure 4:
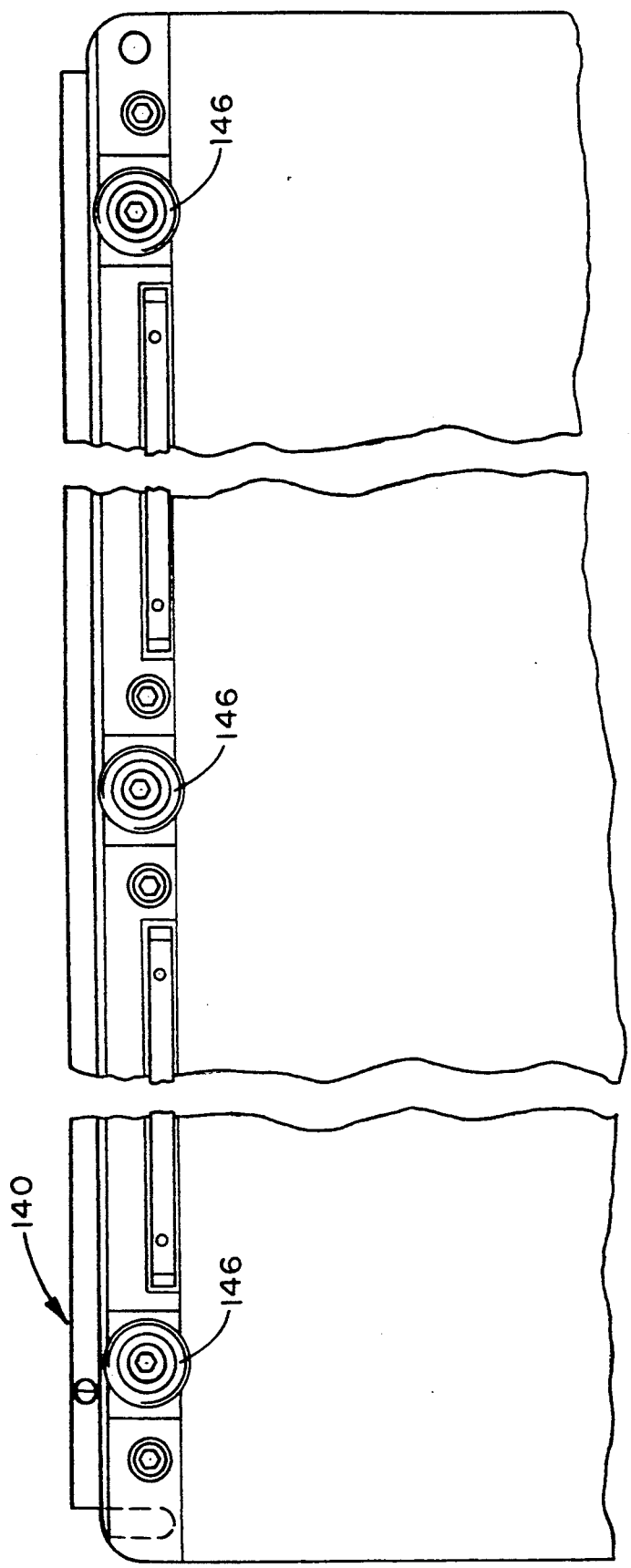
FIG. 4 is a front view of the detector head mounted collimator receiving track.

With continuing reference to FIG. 1 and further reference to FIGS. 3 and 4, detector heads 32 and 34 each have a like guide track 140 which slidably interacts with a matching track 142 on a collimator 144. One of the detector head and collimator tracks, the collimator track 140 in the preferred embodiment, includes a series of spherical bearings 146 which rollably supports the other track. These spherical bearings are positioned to provide support for a J-shaped upper surface 148 of the collimator track 142 even when the collimator is at an angle to the detector head. This enables the collimator to hang at an angle of about 5° relative to the detector head during transfer to prevent damage to the detector head or collimator during transfer.

With reference to FIGS. 5 and 6, an anchoring means 150 selectively anchors the collimator to a lower portion of the head. The detector head is positioned about 5° off vertical and the collimator is rolled onto the head guide rail 140 until it contacts stop 152. A latching handle 154 on the rear of the head is rotated to extend a hooked rod 156. More specifically, the handle 154 rotates downward causing a cam 158 to rotate analogously. The cam urges a rear surface of the hooked rod 156 outward against the biasing force of spring 160. Preferably, a connecting rod 162 interconnects the handle with a second cam 158' at the opposite end of the head to cause a second hooked rod 156' to extend concurrently.

With reference to FIGS. 7 and 8, the lower portion of the collimator is swung manually toward the head. Catches 170 and 170' engage beveled surfaces 172, 172' of the hooked rods 156, 156' and are cammed aside.

When the collimator is swung farther, a spring 174 urges the catches 170, 170' under hooks 176, 176: of the hooked rods. A connecting rod 178 connects catches 170, 170' such that both move together. This prevents one but not both catches from engaging the hooks.

The operator returns the handle 154 to its original position rotating cams 158, 158' and allowing springs 160, 160' to retract the hooked rods. This locks the collimator firmly and non-slidably against the head.

To release the collimator, head is positioned about 5° from vertical and the handle is again rotated to extend the hooked rods. The operator presses activator button 18D withdrawing both latches 170, 170'. The collimator is free to swing under gravity to a vertical position. When any oscillating movement is damped, the collimator can be rolled vertically off the detector head.

Figure 10:
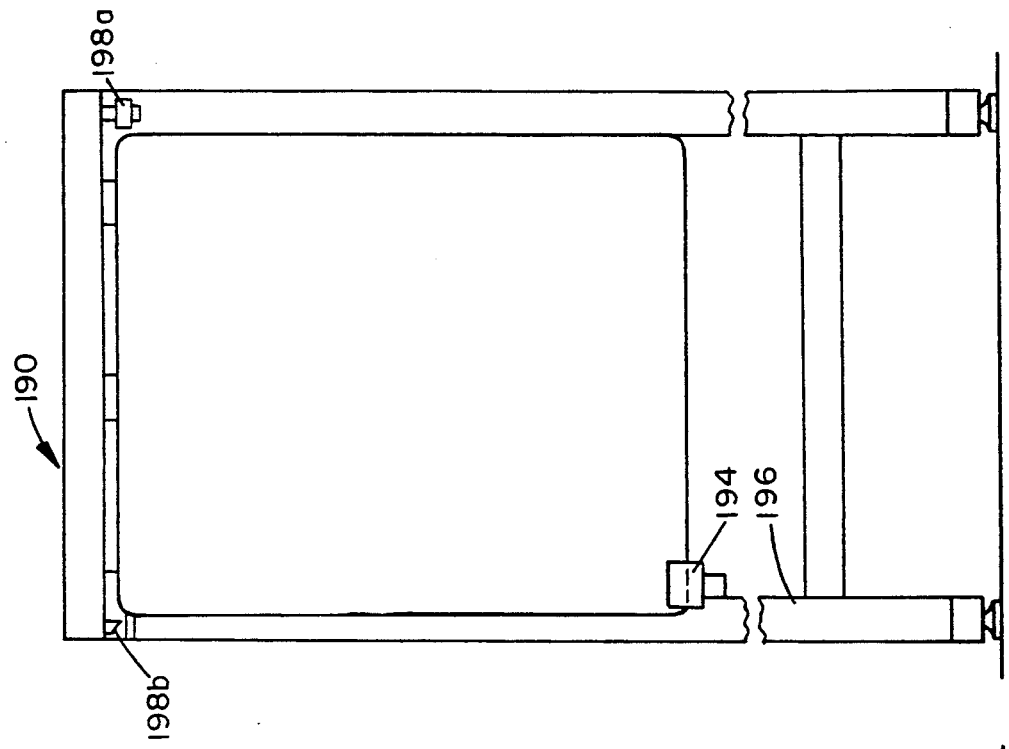
FIGURE 10 is a side view of the collimator storage rack.
Figure 9:
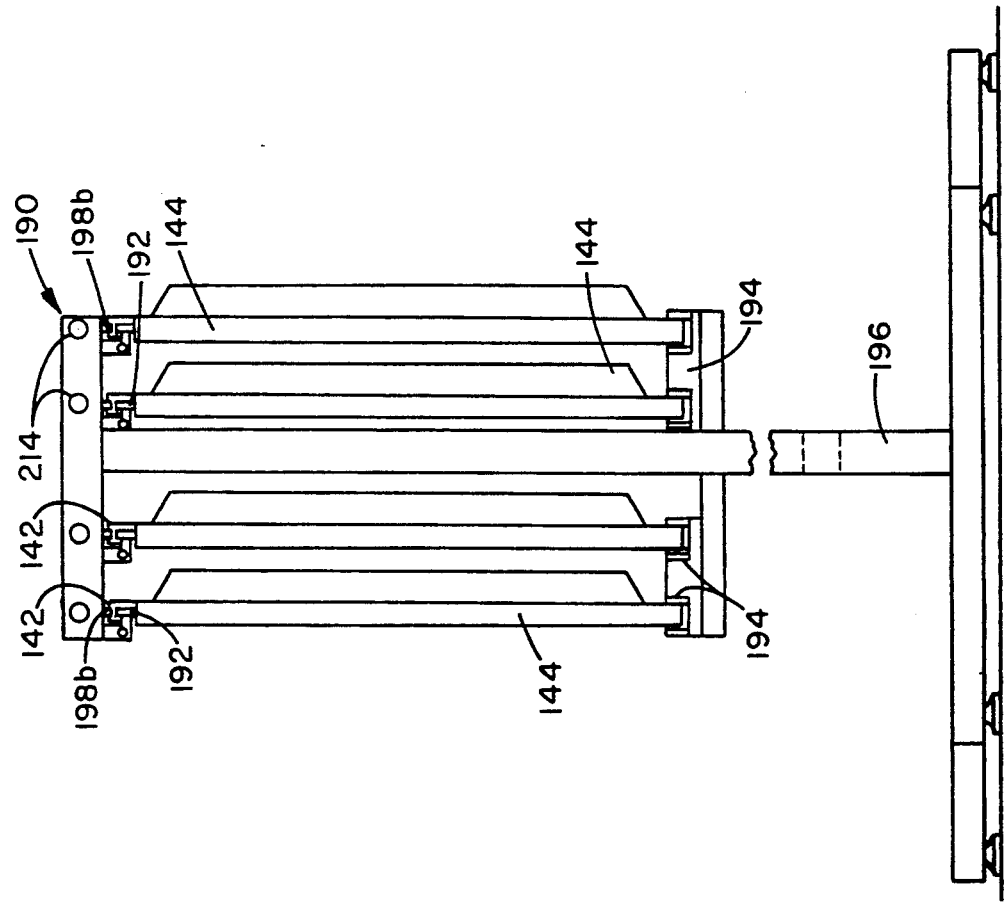
FIG. 9 is a front view of a collimator storage rack in accordance with the present invention.

With reference to FIGS. 9 and 10, in storage, the collimators 144 are hung vertically on a collimator storage rack 190. The storage rack includes a plurality of tracks 192 analogous to track 140 of the detector heads for slidably receiving the J-shaped track portion 142 of a collimator to be stored. Lower guideways 194 prevent a bottom edge of the collimators from swinging and impacting each other or associated structures. A support stand 196 securely anchors the structure to the floor. A collimator locking means 198 selectively locks the each collimator hung on the rack against movement. The locking means includes a rear bumper or stop 198a and a retractable front release pin 198b.

Figure 12:
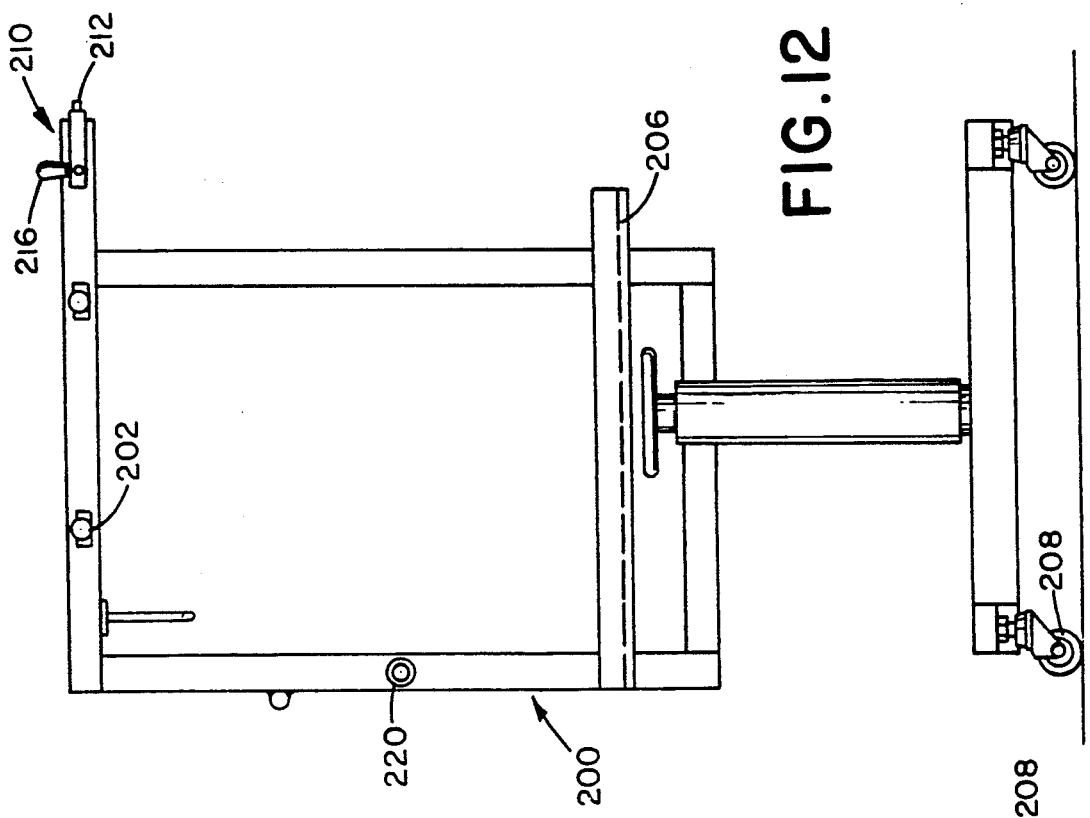
FIG. 12 is a side view of the collimator transfer cart of FIG. 11.
Figure 11:
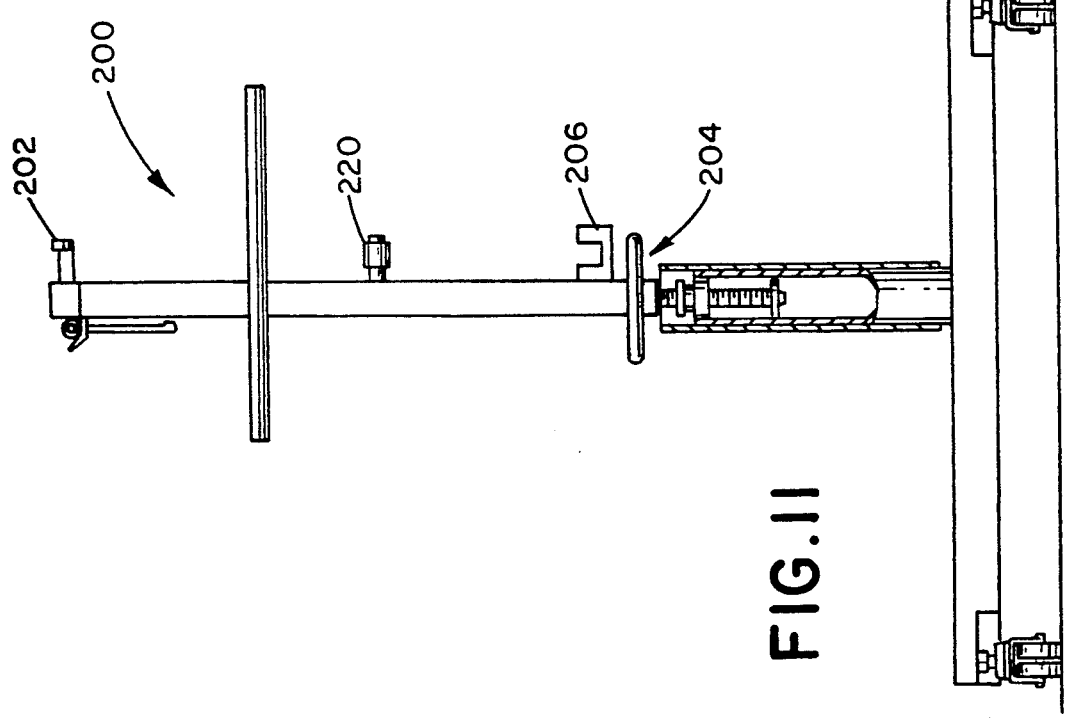
FIG. 11 is a front view of a collimator transfer cart in accordance with the present invention.

With reference to FIGS. 11 and 12, a transfer cart 200 includes an upper track or roller means 202 which is analogous to the detector head guide track 140 for slidably receiving the J-shaped track portion 142 of the collimators. More specifically, the transfer cart includes a height adjustment means 204 for selectively adjusting the height of the upper roller or track means 202. A guide means 206 prevents the collimator from swinging while it is transported. Lateral movement means, particularly wheels 208, enable the cart to be positioned from side to side and fore and aft.

Figure 13:
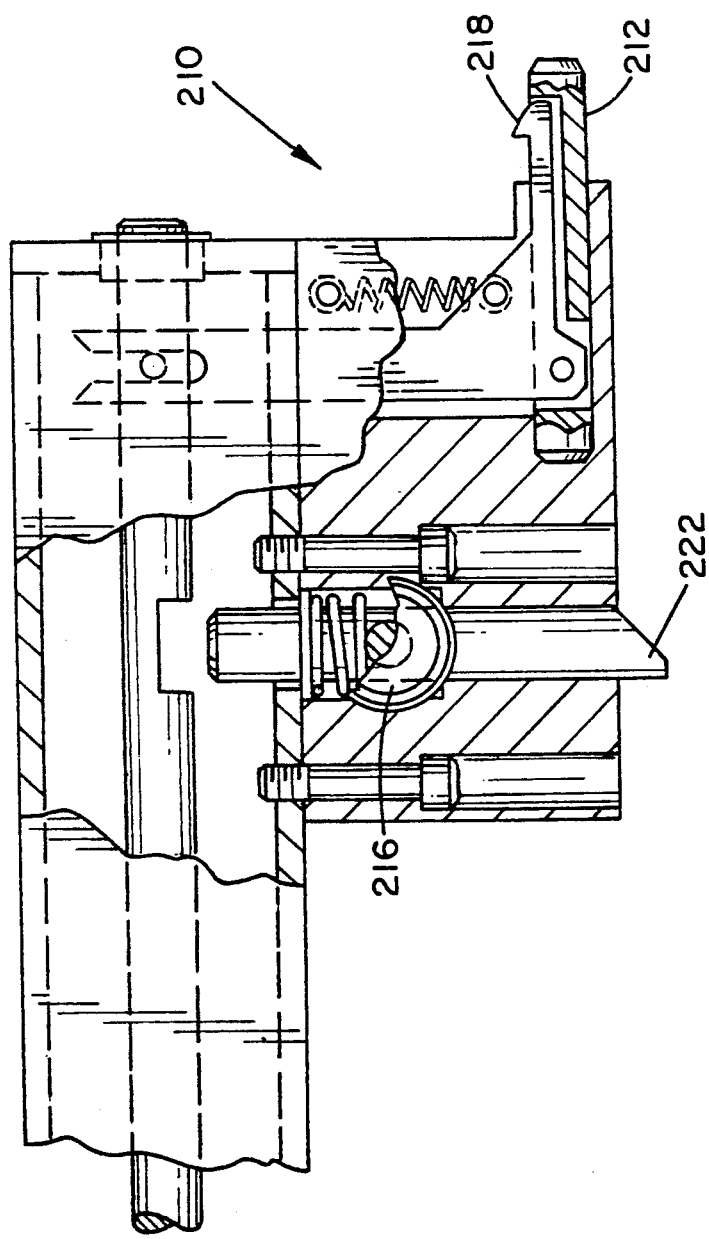
FIG. 13 illustrates an assembly for aligning and interconnecting the transfer cart with a detector head and the storage cart while a collimator is transferred therebetween.
Figure 14:
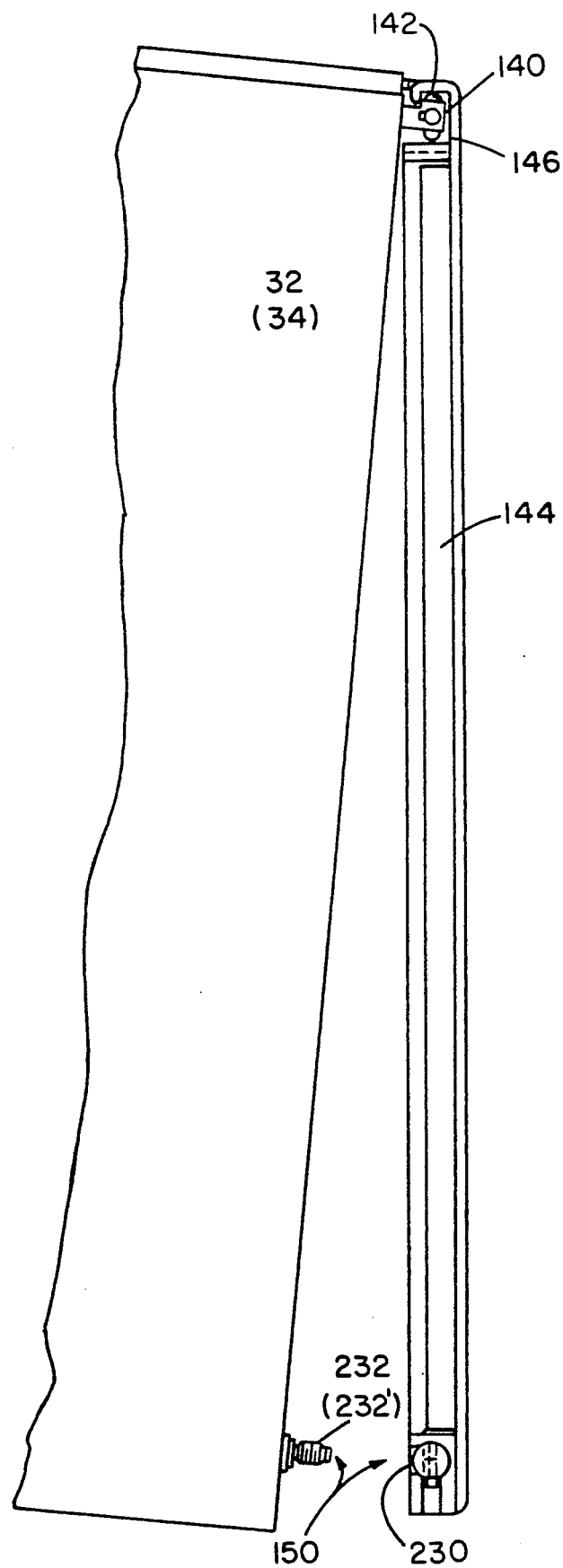
FIG. 14 is a side view of a collimator and head illustrating an alternate mechanism for latching the collimator to the head.
Figure 16:
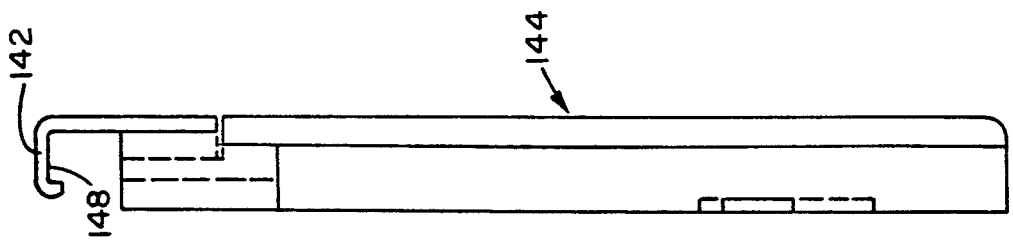
FIG. 16 is a side view of the collimator.
Figure 15:
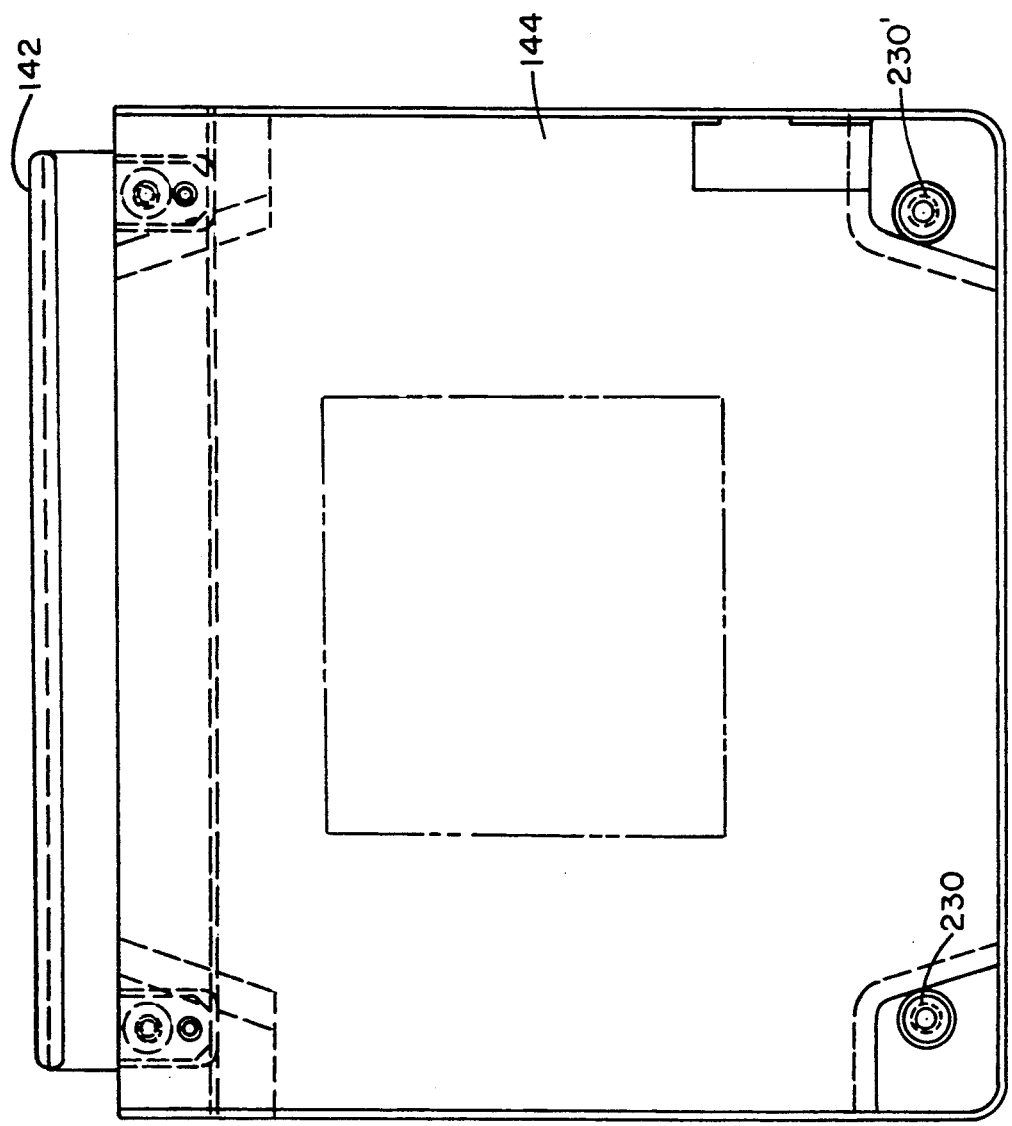
FIG. 15 is a back or inside view of one of the collimators.
Figure 17:
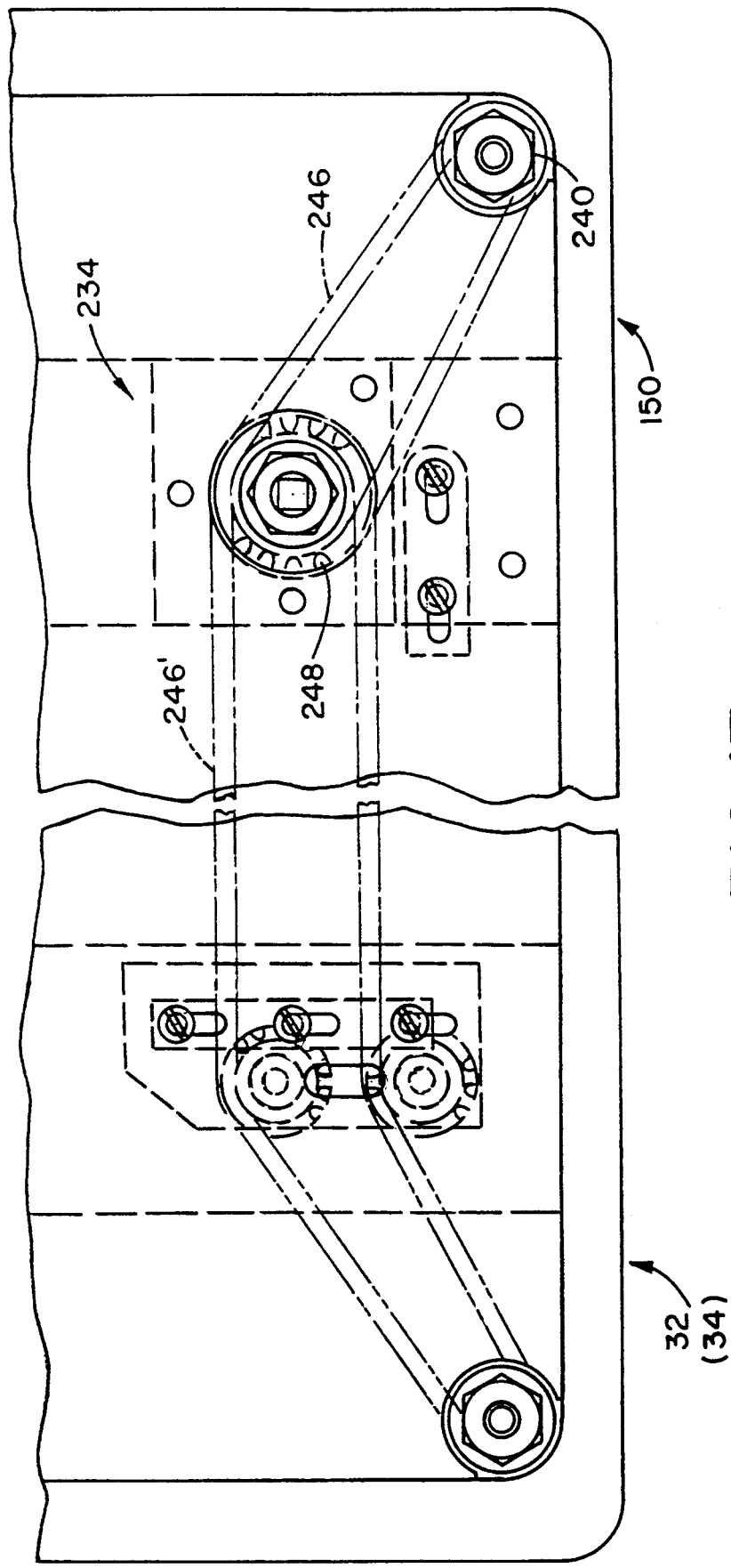
FIG. 17 is a front or top view of the detector head illustrating the collimator connection arrangement.
Figure 18:
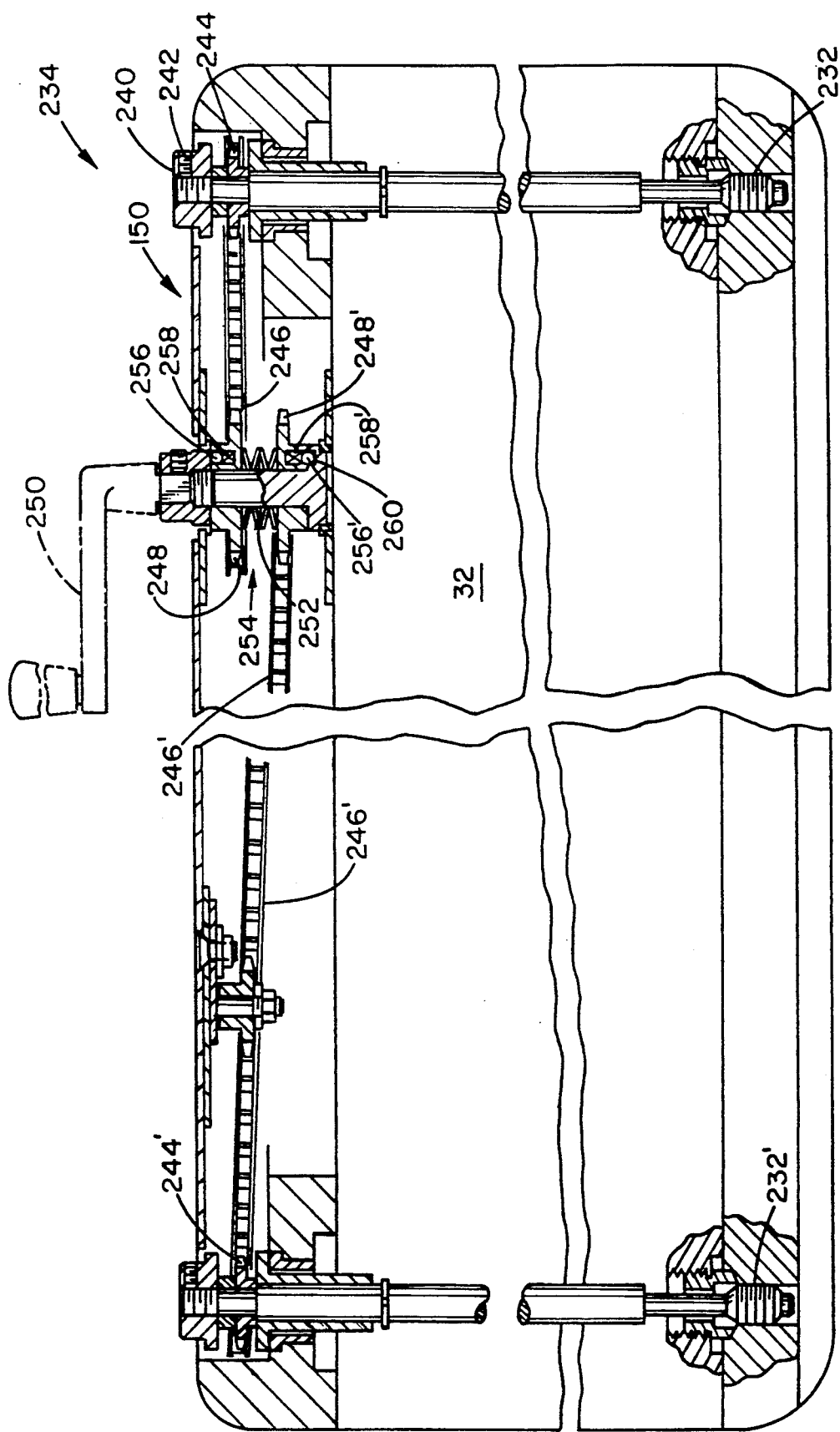
FIG. 18 is a side sectional view of the detector head of FIG. 17.

With continuing reference to FIG. 12 and further reference to FIG. 13, an alignment means 210 selectively locks the transfer cart 200 into alignment with the stationary storage rack 190 and one of the detector heads 32, 34. More specifically, the transfer cart has a pin 212 which is received in a complementary bushing 214 adjacent each track of the rack 198 and the detector heads 32, 34. A handle means 216 is moved to cause a detent 218 on the pin 212 to project outward locking the pin into the receiving bushing 214.

The transfer cart 200 further includes a stop 220 for limiting receipt of the collimator onto the cart. The handle means 216 also controls a locking pin 222 for selectively locking the collimator onto the transfer cart. More specifically, movement of the handle in one direction engages and releases the alignment pin detent 218 and movement of the handle in the other direction or mode controls the locking means 222.

With reference to FIGS. 14-18, various anchoring means 150 can be provided for selectively anchoring the collimator to a lower portion of the detector head. In an alternate embodiment, the collimator includes a threaded bushing 230 which threadedly receives a rotatable, threaded stud 232. A detector head mounted drive mechanism 234 selectively rotates the threaded stud 232 to engage the threaded bushing 230 and clamp the two together with a preselected amount of torque. Preferably, a second bushing 230' and stud 232' are provided at an opposite lower corner of the collimator and detector head.

A threaded nut 240 is attached to the threaded stud 232 and is prevented from rotating on the stud by a pin or set screw 242. A sprocket 244 is provided for rotating the stud 232. A chain drive 246 connects the stud sprocket with a drive sprocket 248 driven by a turning knob or crank 250. Frictional force provided by one or more springs 252 or other friction clutch means allows force to be transferred to sprocket 244 from the rotating crank when rotating clockwise until the spring force is exceeded. When the frictional force exerted by the spring 252 is exceeded, then the stud 232 and sprocket 244 cease rotating and sprocket 24 and starts to slip rotationally.

A second drive sprocket 248' of the drive means is connected by a second chain 246' to a corresponding stud sprocket assembly 244' of the second threaded stud 232'. The crank 250 continues to drive the chains until both friction clutches 252, allow both stud sprockets 248, 248' to slip causing the associated threaded studs 232, 232' to stop rotating. In this manner, one of the sprockets and associated threaded studs can continue rotating even after the first threaded shaft has been secured to its associated threaded bushing with the selected torque.

When releasing the collimator, the crank 250 is rotated in the opposite direction. A one way clutch means 254 causes the sprockets 248 to engage the rotating crank or an associated rotating crank receiving bushing in a positive, non-friction manner. The one way clutch means includes a spring-loaded ball bearing 256 which is located in a hole 258 in the sprocket 248. The ball falls into a ramped slot 260 in the crank receiving bushing at one end. When the crank is rotated clockwise, the ball drops into the slot and rolls out on the ramped surface. When the crank rotates counterclockwise, the ball falls down the ramp and is prevented from rolling further by a perpendicular wall at an opposite end of the slot. When this happens, the sprocket 248 is locked against rotating relative to the drive crank and bushing to allow the friction clutch 252 to be by-passed during collimator releasing.

The invention has been described with reference to the preferred embodiments. Obviously, modifications and alterations will occur to others upon reading and understanding the preceding specification. It is intended that the invention be construed as including all such alterations and modifications insofar as they come within the scope of the appended claims or the equivalents thereof.

Having thus described the preferred embodiments, the invention is now claimed to be:

1. A nuclear camera system comprising:
    a gantry for movably supporting a detector head;
    a storage rack for hanging collimators vertically, the detector head and an upper end of each collimator include interacting channel portions such that the vertically oriented collimators can be hung from and horizontally moved along the interacting channel portions;
    a transfer cart for receiving a collimator vertically from the rack and transporting the collimator vertically to the detector head, when the detector head is positioned generally vertically.

2. The system as set forth in claim 1 wherein one of the detector head and collimator channel portions include spherical bearing members upon which the other channel portion is supported to provide rolling interengagement therebetween.

3. The system as set forth in claim 1 further including a collimator connecting means for securely connecting a lower portion of the collimator to the detector head.

4. The system as set forth in claim 3 wherein the collimator connecting means includes:
 a hooked member for selectively engaging a catch member on the collimator,
 a means for selectively extending and retracting the hook member.

5. The system as set forth in claim 1 wherein the transfer cart includes a channel portion for receiving the channel portion of the transported collimator thereon and wherein the storage rack includes a plurality of channel portions for receiving the channel portions of stored collimators.

6. The system as set forth in claim 5 wherein the detector head, cart, and rack channel include rolling bearing means for rollingly receiving the collimator channel portion thereon.

7. The system as set forth in claim 6 wherein the rack and cart each include a locking for selectively blocking a collimator received thereon against horizontal movement.

8. The system as set forth in claim 5 wherein the cart, rack, and detector heads include an alignment means for selectively locking the cart channel portion into alignment with the detector head and the rack channel portions.

9. The system as set forth in claim 8 wherein the alignment means includes a pin and bushings, the bushings being mounted on the detector head and rack and the pin being mounted on the cart.

10. The system as set forth in claim 1 wherein the gantry further movably supports a second detector head, the first and second detector heads each having a channel portion positionable horizontally for receiving a collimator channel portion disposed adjacent an upper edge of a collimator received horizontally therealong, the cart and the rack also having channel portions for receiving the collimator channel portion horizontally therealong.

11. The system as set forth in claim 10 wherein the detector head, cart, and rack channel portions include rolling bearing means such that the collimator channel portion is rollingly received for horizontal movement therealong.

12. A nuclear camera system comprising:
 a gantry for movably supporting a detector head;
 a storage rack for hanging collimators vertically;
 a collimator connecting means for securely connecting a lower portion of the collimator to the detector head, the collimator connecting means includes:
  a hooked member for selectively engaging a catch member on the collimator,
  a means for selectively extending and retracting the hook member,
  a cam surface on a leading end of the hook member for camming the catch member laterally as the hook and catch members engage,
  a means for selectively moving the catch member laterally to release the connecting means;
 a transfer cart for transferring the collimators vertically between the detector head and the storage rack.

13. A nuclear camera system comprising:
 a gantry for movably supporting a detector head;
 a storage rack for hanging a plurality of collimators vertically;
 a collimator connecting means for selectively connecting one of the collimators to the detector head, the collimator connecting means including:
  a threaded bushing rigidly mounted into one of the detector head and the collimator;
  a threaded member rotatably mounted in the other of the detector head and the collimator for selective threaded receipt into the bushing;
  a rotating means for rotating the threaded member;
  a torque limiting means connected between the rotating means and the threaded member for limiting an amount of torque with which the threaded member and the bushing interengage;
 a transfer cart for transferring the collimators between the storage rack and the detector head.

14. A nuclear camera system comprising:
 a gantry for movably supporting a detector head, the gantry including:
  a pair of parallel guide members to which the detector head is movably mounted at opposite sides thereof;
  a motor means for selectively moving a driven side of the detector head along one of the guide members; and
  a canting eliminating means which interconnects the driven side of the detector head with a free side of the detector head for maintaining the detector head in a perpendicular relationship with the guide members, without regard to amounts of weight added by different collimators;
 a storage means for storing a plurality of collimators;
 a transfer means for transferring the collimators between the detector head and the storage means.

15. The system as set forth in claim 14 wherein the canting eliminating means includes a first cable means extending from the driven side parallel to the guide members toward and around a more centrally mounted pulley means, around a peripheral end of the detector head, and parallel to the guide members to the free side.

16. The system as set forth in claim 15 wherein the canting eliminating means further includes a second cable means extending from the free side parallel to the guide members toward and around a more centrally mounted pulley means, around a peripheral end of the detector head, and parallel to the guide members to the driven side.

17. A collimator transporting cart for moving a rectangular collimator hung with planar radiation receiving and discharging faces in a vertical orientation to a detector head of a nuclear camera for mounting on the detector head when a radiation sensitive face of the detector head is oriented substantially vertically, the cart comprising:
 a frame;
 a wheel means for movably supporting the frame on a floor;
 a track portion mounted horizontally on the frame parallel to the planar radiation receiving and discharging collimator faces for receiving a mating collimator track portion which extends parallel to the planar radiation receiving and discharging collimator faces such that the collimator hangs vertically from the cart track portion.

18. The cart as set forth in claim 17 wherein the cart track portion includes roller means on which the collimator track portion rolls horizontally.

19. The cart as set forth in claim 18 further including a locking means for locking a transported collimator against rolling off the cart track portion.

20. The cart as set forth in claim 17 wherein the cart includes an alignment means for selectively fixing the cart with the cart track portion in alignment with a detector head track portion and a storage rack track portion.

21. A stationary storage rack for storing a plurality of flat, rectangular collimators for a nuclear camera hung with flat rectangular faces thereof in a vertical orientation, the rack comprising:
a frame which is supported on a floor;
a plurality of parallel horizontal track portions mounted along the rack and including rolling bearings mounted in each track for rollingly receiving a mating flange at an upper end of each vertically stored rectangular collimator, the mating flange extending parallel to the flat rectangular collimator faces such that the plurality of flat rectangular collimators are stored stationarily side by side parallel to each other.

22. A nuclear camera comprising:
a gantry for movably supporting at least a first detector head which has a track portion extending therealong, such that the detector head is positionable with the track portion substantially horizontally;
a collimator having a track portion which is positionable to slide horizontally along the detector head track portion with the collimator hanging vertically therefrom;
a roller bearing means disposed between the detector head and collimator track portions to provide rolling, horizontal movement between the detector head and collimator tracks; and
a collimator connecting means for selectively connecting the collimator against movement to the detector head.

23. The camera as set forth in claim 22 further including an alignment means for selectively fixing the detector head track portion in alignment with a track portion of a transfer cart.

24. A method of mounting a collimator on a nuclear camera detector head, the method comprising:
positioning the camera head canted from vertical;
moving the collimator hanging vertically adjacent the detector head such that the collimator guide track aligns with a horizontal guide track adjacent an upper end of the detector head;
rolling the collimator guide track horizontally along the detector head guide track such that the collimator hangs vertically from the detector head guide track;
swinging a lower end of the collimator toward a lower end of the detector head;
releasably securing the lower collimator and detector head ends together.

25. The method as set forth in claim 24 further including:
storing the collimator hanging by the collimator guide vertically from a rack guide track;
aligning a guide track mounted horizontally on a transfer cart with the rack guide track;
rolling the collimator guide track horizontally from the rack guide track onto the transfer cart guide track;
in the mounting step, aligning the transfer cart guide track with the detector head guide track such that in the rolling step the collimator guide track rolls from the transfer cart guide track to the collimator guide track.

26. A nuclear camera system comprising:
a gantry for movably supporting at least one detector head such that the detector head is positionable with a radiation receiving face thereof generally horizontally for receiving radiation from a prone subject and generally vertically;
a plurality of collimators, each collimator having a generally flat surface for mounting against the radiation receiving face of the detector head for collimating radiation received by the detector head, the collimators having different thicknesses for collimating radiation received by the detector head to different degrees;
a storage rack for hanging the plurality of collimators with their generally flat surfaces hanging vertically and parallel to each other;
a transfer cart for receiving one of the collimators vertically from the storage rack and transporting the collimator vertically to the detector head, when the detector head is positioned generally vertically, the cart positioning the transported collimator to bring the flat surface thereof generally parallel to the detector head planar radiation receiving surface in a vertical orientation.

* * * * *